United States Patent [19]
Jordan et al.

[11] 3,947,673
[45] Mar. 30, 1976

[54] APPARATUS FOR COMPARING TWO BINARY SIGNALS

[75] Inventors: James Redmon Jordan, Dunfermline; Robert Graham Kelly, Balerno, both of Scotland

[73] Assignee: National Research Development Corporation, London, England

[22] Filed: Aug. 23, 1974

[21] Appl. No.: 499,990

[30] Foreign Application Priority Data
Aug. 24, 1973 United Kingdom............... 40266/73

[52] U.S. Cl.......... 235/181; 235/92 CA; 235/92 SH; 235/150.53; 340/146.2
[51] Int. Cl.²...................... G06F 7/02; G06F 15/34
[58] Field of Search.......... 235/181, 150.53, 151.34, 235/92 CA, 92 SH; 340/172.5, 146.2

[56] References Cited
UNITED STATES PATENTS

| | | | |
|---|---|---|---|
| 3,725,689 | 4/1973 | Kautz | 235/181 |
| 3,777,133 | 12/1973 | Beck et al. | 235/181 |
| 3,819,919 | 6/1974 | McGunigle | 235/151.34 |

*Primary Examiner*—Felix D. Gruber
*Attorney, Agent, or Firm*—Cushman, Darby & Cushman

[57] ABSTRACT

In known correlation apparatus for identifying the delay between two signals, the current polarity of the lagging signal is repeatedly compared with sets of successively earlier samples of the polarity of the leading signal which are temporarily stored in a binary word register, the results are counted for each digit position of the word, and a signal is generated indicating the position for which the count first reaches a given value. Such apparatus is improved by using as the register a plurality of serially connected shift registers which are operated at different integrally related speeds.

8 Claims, 3 Drawing Figures

APPARATUS FOR COMPARING TWO BINARY SIGNALS

This invention relates to apparatus for comparing two binary signals, of the kind comprising a register operative to store temporarily, in respect of each of a series of regularly recurrent instants, a binary word the digits of which correspond in sequence to the states of a first one of the two binary signals at times earlier by successively greater amounts than the relevant one of said series of instants, means for effecting a sequence of comparison operations in each of which the state of the second of the two binary signals is compared with each of the digits of said binary word, means for counting the results of the comparisons separately for each digit position of the binary word, and signalling means for generating a signal whose form indicates for which digit position of the binary word the count first reaches a given value.

The succession of the states of each digit of the binary word for said series of instants corresponds to a series of samples of a delayed version of the first binary signal, the delay increasing successively through the sequence of digit positions of the binary word. Accordingly, an apparatus of the kind specified is operative automatically to give an approximate indication of that value of delay between the two binary signals for which the cross-correlation function of these signals has its maximum value.

An apparatus of this kind is disclosed in the specification of U.S. Pat. No. 3,810,113. As explained in that specification, a particularly important application for such an apparatus arises in connection with certain known methods of flow measurement in which flow velocity is determined by identifying the time delay between two related noise signals, this time delay being inversely proportional to the flow velocity. In the specific apparatus described by way of example in the aforesaid specification, the register is arranged to operate so that there are equal increments of delay between the successive delayed versions of the first binary signal corresponding to the different digit positions of the binary word. This arrangement has the advantage of facilitating a modular form of construction for the apparatus, but in the case of the application to flow measurement it has the disadvantage that the maximum fractional error of the indicated flow velocity is inversely proportional to the identified time delay. This factor may give rise to a requirement for an excessively large number of digit positions in the binary word if, as will normally be the case, it is required that the maximum fractional error of the indicated flow velocity should not exceed a given value over a substantial range of velocities.

It is an object of the present invention to provide an apparatus of the kind specified which is improved in this respect.

According to the invention, in an apparatus of the kind specified the register comprises a plurality of shift registers each having a serial input and connected in a serial chain so that the stages of all the shift registers form a sequence corresponding to the sequence of digit positions of the binary word, means being provided for operating the shift registers so that those digits of the binary word temporarily stored in the first shift register of the chain can change state for each of the instants of said series while those digits of the binary word temporarily stored in any shift register other than the first in the chain can change state only for each Nth one of the instants for which those digits of the binary word temporarily stored in the preceding shift register in the chain can change state, N being a small integer (preferably two).

With this arrangement the increments of delay between those delayed versions of the first binary signal corresponding to the stages of any shift register other than the first in the chain will be N times the corresponding increments in respect of the preceding shift register in the chain. This enables the requirement referred to above in respect of the flow measurement application to be satisfied in any given case with an apparatus in which the number of digit positions in the binary word is substantially smaller than would be the case if all the delay increments were equal.

Preferably in an apparatus according to the invention the signalling means is operative to generate a signal whose form indicates the value of the delay for that delayed version of the first binary signal corresponding to the digit position of the binary word for which the count first reaches said given value.

The invention will be further described with reference to the accompanying drawings, in which.

In principle the determination of the time delay between two signals $A(t)$ and $B(t)$ by cross-correlation requires computation of the function $$C(y) = \frac{1}{T} \int_o^T A(t) \cdot B(t-y) dt$$

for all possible values of the delay parameter $y$, and the identification of that value of $y$ for which the function $C(y)$ has its maximum value. In the apparatuses illustrated in FIGS. 2 and 3 this procedure is simplified in various ways which enable it to be mechanised in a wholly digital fashion. Firstly, instead of computing the function $C(y)$ use is made of the polarity form given by the expression $$\frac{1}{T} \int_o^T \frac{A(t)}{A(t)} \cdot \frac{B(t-y)}{B(t-y)} dt.$$

Secondly, instead of performing a true integration, use is made of numerical counting in conjunction with sampling of the signals at discrete intervals. Thirdly, the count is evaluated only for a series of discrete values of the parameter $y$. It will be appreciated that these simplifications result in some degree of approximation in the determination of the time delay, but in general this approximation is of an acceptable order.

Figure 1:
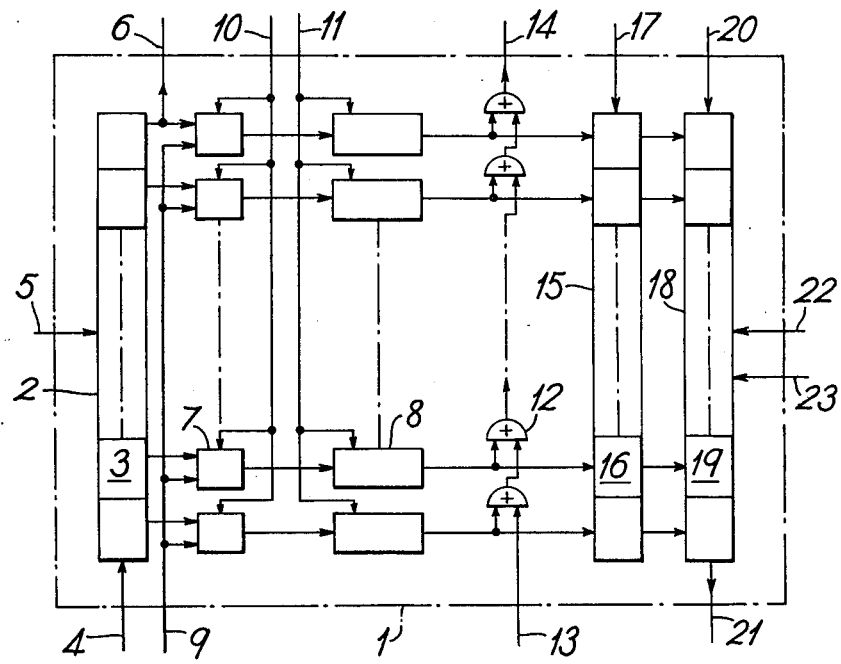
FIG. 1 is a diagram of a unit which may be used in an apparatus of the kind specified.

Referring now to FIG. 1, the unit shown therein is designated by the general reference numeral 1 and comprises a binary shift register 2 having a large number (R) of stages 3. The register 2 has a serial input which is connected to a first input signal line 4 to which a binary signal may be applied, a shift line 5 to which pulses may be applied to determine the instants at which the states of the stages 3 may change (between logic 0 and 1 in either sense), and a set of parallel output lines corresponding respectively to the stages 3; the output of the last stage 3 of the register 2 is also connected to a serial output line 6. Each stage 3 of the register 2 has associated with it means for effecting a sequence of comparison operations comprising a clocked coincidence detector 7 and means for counting the results of the comparison comprising a pulse counter 8, all the detectors 7 and all the counters 8 being identical. Each detector 7 has two inputs, one of which is connected to the output of the corresponding stage 3 and the other of which is connected to a second input signal line 9 to which a binary signal may be applied, and has a control terminal which is connected to a coincidence clock line 10 to which a train of pulses may be applied; the detectors 7 are operative so that each time a pulse is applied to the line 10 a corresponding pulse will appear at the output of a particular detector 7 if, and only if, the state of the output of the corresponding stage 3 is the same as that of a binary signal applied to the line 9. The output of each detector 7 is connected to the input of the corresponding counter 8, each counter 8 having a counting capacity P and being operative so that, starting from a condition of zero count, its output will be in the logic 0 state until P pulses have been applied to its input, when the output will change to the logic 1 state and will remain in this state until the zero count condition is restored by the application of a logic 1 signal to the reset terminal of the counter; the reset terminals of all the counters 8 are connected to a reset line 11. The condition of a counter 8 when its output is in the logic 1 state will subsequently be referred to as the overload condition.

The outputs of the counters 8 are respectively connected to inputs of a chain of OR gates 12, the second input of each gate 12 except the first in the chain being connected to the output of the preceding gate 12 in the chain; the second input of the first gate 12 in the chain is connected to a gate input line 13 and the output of the last gate 11 in the chain is connected to a gate output line 14. It will be appreciated that a logic 1 signal will appear on the line 14 whenever any of the counters 8 is in the overload condition.

The unit 1 further comprises a pattern register 15 incorporating a set of R binary storage devices 16, which is operative to store temporarily the set of states of the outputs of the counters 8. The register 15 has a control line 17 arranged so that when a logic 1 signal is applied to the line 17 the devices 16 are respectively addressed by the outputs of the counters 8, and while a logic 0 signal is applied to the line 17 the devices 16 remain in the states in which they were set on the last application of a logic 1 signal to the line 17.

Finally, the unit 1 comprises a second binary shift register 18 having R stages 19, which correspond in reverse order to the stages 3 of the register 2. The register 18 has a serial input line 20, a serial output line 21, a set of parallel input lines corresponding respectively to the stages 19 and respectively connected to the outputs of the devices 16, a shift line 22, and a control line 23 arranged so that when a logic 1 signal is applied to the line 23 the stages 19 will be addressed via the parallel input lines and hence will take up states in accordance with the information temporarily stored in the register 15, and while a logic 0 signal is applied to the line 23 the shift register 18 will be operable in conventional manner under the control of pulses applied to the shift line 22.

It will be appreciated that the unit 1 effectively consists of a set of R identical sub-units each comprising one of the stages 3 and a string of components associated with that stage. The unit 1 therefore readily lends itself to a modular form of construction, in which it is built up using modules each comprising a fraction of R such sub-units; preferably such modules are fabricated by large scale integrated circuit techniques.

Figure 2:
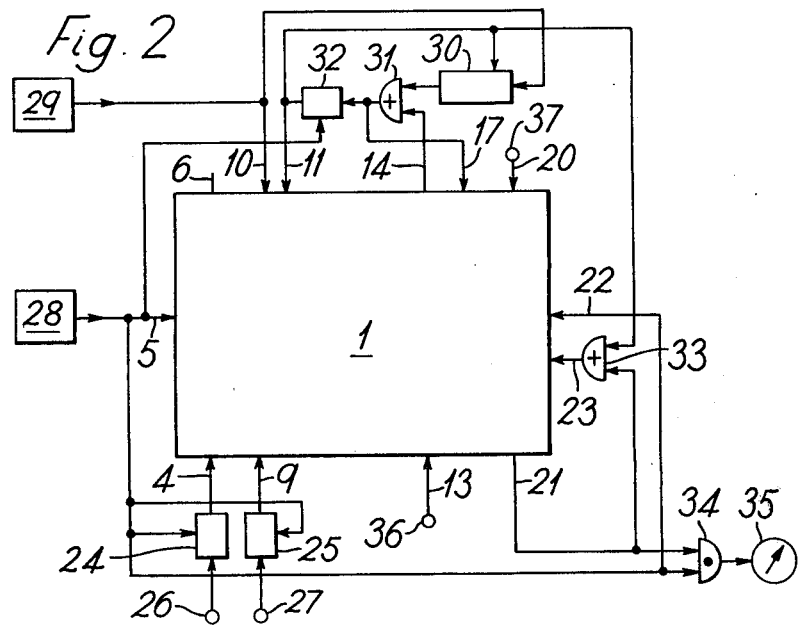
FIG. 2 is a diagram of an apparatus for automatically identifying the time delay between two related noise signals.

Turning now to FIG. 2, the apparatus illustrated therein comprises a unit 1 as described above, in which the number R is made 240. The apparatus further comprises a pair of polarity samplers 24 and 25 whose inputs are respectively connected to terminals 26 and 27 to which in operation there are respectively applied the leading and lagging ones of the two noise signals to be compared; the outputs of the samplers 24 and 25 are respectively applied to the lines 4 and 9 of the unit 1. The apparatus further includes a sample pulse generator 28 which generates a train of pulses of frequency F pulses per second, these pulses being applied to control the operation of the samplers 24 and 25 and also being applied to the shift lines 5 and 22 of the unit 1. Each sampler 24 or 25 is operative, under the control of the sample pulses from the generator 28, to provide a binary signal whose state will change on the application of a sample pulse if, and only if, the polarity of the relevant noise signal is different from what it was on the application of the previous sample pulse; the samplers 24 and 25 may for example each consist of a simple polarity detector followed by a stage similar to the stages 3 of the register 2. It will be appreciated that, provided the value of F is sufficiently high, the output of each sampler 24 or 25 will approximate to a binary signal which changes its state whenever the polarity of the relevant noise signal changes, and that the outputs of the successive stages 3 of the register 7 will be in the form of a series of increasingly delayed versions of the output of the sampler 24, the value of the delay for the $r$ th of the stages 3 being equal to $r/F$ seconds. The value of f is chosen so that the delay ($240/F$ seconds) for the last stage 3 of the register 2 exceeds the maximum anticipated value of the time delay to be identified; in the case of flow measurement this will of course correspond to the minimum expected flow rate.

The apparatus further includes a coincidence pulse generator 29 which generates a train of pulses of frequency G pulses per second, these pulses being applied to the line 10 of the unit 1 and also to the input of a timing counter 30 which is of similar form to the counters 8, but has a counting capacity Q greater than P. It is convenient to make G equal to F, in which case the generators 28 and 29 can be one and the same. it may in some cases, however, be desired to obtain a more rapid indication of the time delay between the noise signals (at the expense of some reduction in accuracy) and G will then be made considerably higher than F; in this case the generator 28 may conveniently be constituted by a pulse frequency divider to the input of which is applied the output of the generator 29. In other cases it may be desired to make G less than F, in order to give a relatively long integrating time and hence a relatively small statistical error in determining the time delay; when this is required the generator 29 may conveniently be constituted by a pulse frequency divider to the input of which is applied the output of the generator 28.

The output of the counter 30 is connected to one input of an OR gate 31, the other input of the gate 31 being connected to the line 14 of the unit 1, and the output of the gate 31 being connected to the line 17 of the unit 1 and to the input of a stage 32, similar to the stages 3 of the register 2, which is operative under the control of the pulses derived from the generator 28 to delay a binary signal applied to its input by 1/F seconds. The output of the stage 32 is connected to the line 11 of the unit 1, to the reset terminal of the counter 30, and to one input of an OR gate 33 whose output is connected to the line 23 of the unit 1.

The line 21 of the unit 1 is connected to the other input of the gate 33 and to one input of an AND gate 34, the other input of the gate 34 being connected to the output of the generator 28 and the output of the gate 34 being connected to a pulse frequency meter 35. The lines 13 and 20 of the unit 1 are respectively connected to terminals 36 and 37 to which a continuous logic 0 signal is applied in operation, while the line 6 of the unit 1 is left unconnected.

In operation of the apparatus the output of each detector 7 in the unit 1 consists of a series of pulses occurring whenever, on the occasion of a coincidence pulse applied from the generator 29 to the line 10, there is a coincidence between the current state of the output of the sampler 25 and the state of the output of the sampler 24 at some instant earlier in time by an amount equal to the delay corresponding to the stage 3 with which the relevant detector 7 is associated; each such series of pulses is counted by the corresponding counter 8. Thus, starting from a condition of zero count in all the counters 8, after the occurrence of X coincidence pulses the numbers registered in the respective counters 8 (assuming that none of them has gone into the overload condition) will be approximately related to the values of the polarity correlation function $$\frac{1}{T}\int_o^T \frac{A(t)}{|A(t)|}\frac{B(t-y)}{|B(t-y)|}dt$$

for a series of values of y respectively equal to the first 240 integral multiples of 1/F seconds, where T is equal to X/G seconds and A(t) and B(t) are respectively the lagging and leading noise signals; the approximation will improve as X, and hence T, increases. It should be noted that a number Y registered in one of the counters 8 corresponds to a value of the correlation co-efficient equal to 2(Y/X)−1.

As will be explained more fully below, the apparatus includes signaling means which is arranged automatically to identify for which of the counters 8 the overload condition first occurs, and hence the value of the delay for which the correlation function has its maximum value; the apparatus is arranged to operate in repeated cycles, in order to provide repeatedly updated information concerning the time delay. The cycles are of variable length, each being terminated as soon as any of the counters 8 or the counter 30 goes into the overload condition. Thus the occurrence of such a condition will result in a logic 1 signal appearing at the output of the gate 31, and hence after a delay of 1/F seconds at the output of the stage 32. All the counters 8 and the counter 30 will then be restored to the condition of zero count, causing the signal at the output of the gate 31 to revert to the logic 0 state. After a further delay of 1/F seconds the signal at the output of the stage 32 will revert to the logic 0 state, permitting a new counting cycle to commence. It will be seen that the minimum value of the integrating time for a cycle is equal to P/G seconds, and in order to obtain accurate results this should be made many times the maximum expected delay. The maximum value of the integrating time for a cycle is equal to Q/G seconds, and Q is chosen so as to ensure that the occurrence of an overload condition for one of the counters 8 can be regarded as statistically significant; more specifically if the detection of a peak in the correlation function regarded as having sufficient significance only if the corresponding value of the correlation co-efficient is not less than S, Q must be made equal to 2P/(S+1). It will thus be appreciated that Q will always be less than 2P, and that the occurrence of an overload condition in the counter 30 before any of the counters 8 has gone into an overload condition will correspond to a cycle in which no significant correlation between the noise signals occurs.

At the end of each cycle a logic 1 signal will be applied to the line 17 for a period of 1/F seconds, and the register 15 will then take in information concerning the position of any significant peak in the correlation function detected during that cycle, the register 15 storing this information throughout the next cycle. The stored information controls the operation of a delay indicator constituted by the shift register 18, the gate 34 and the meter 35.

The operation of the delay indicator during a given cycle may be explained as follows. Assume that during the preceding cycle a significant peak in the correlation function has been detected, the position of this peak corresponding to a time delay of r/F seconds between the noise signals. Throughout the cycle under consideration, therefore, the output of that device 16 of the register 15 which corresponds to the r th stage 3 of the register 2 will be in the logic 1 state while the outputs of all the other devices 16 will be in the logic 0 state. At the beginning of the cycle, the application of a logic 1 signal having a duration of 1/F seconds from the output of the stage 32 to the line 23 via the gate 33 will cause the (241−r)th stage 19 of the shift register 18 to assume the logic 1 state while all the other stages 19 assume the logic 0 state. Leaving aside for the moment the case where r is one, when the signal applied to the line 23 reverts to the logic 0 state the shift register 18 will operate in conventional manner so that when (r−1) of the sample pulses have been applied to the line 22 the last stage 19 of the shift register 18 will assume the logic 1 state. This will result in a further logic 1 signal having a duration of 1/F seconds being applied to the line 23 via the gate 33, causing the stages 19 to be reset again according to the information stored in the register 15. The whole process will then be repeated indefinitely, so that the signal appearing on the line 21 will be in the logic 1 state for periods of 1/F seconds recurring with a frequency of F/r periods per second; during each of these periods one of the pulses from the generator 28 will appear at the output of the gate 34. In the case where r is one, the signal appearing on the line 21 will be continuously in the logic 1 state so that all the pulses from the generator 28 will appear at the output of the gate 34.

Thus when a significant peak in the correlation function has been detected in any given cycle, and the position of this peak corresponds to a time delay of r/F seconds between the noise signals, the signal fed to the meter 35 throughout the next cycle will consist of a train of pulses of frequency F/r pulses per second. The meter 35 will thus give an indication inversely proportional to the time delay, and hence in the case of flow measurement directly proportional to the flow velocity. It should be noted that where the true value of the time delay lies approximately midway between two adjacent ones of the quantized values equal to the integral multiples of 1/F seconds, the corresponding two of the counters 8 may go into the overload condition simultaneously in one cycle. In this case the frequency of the signal fed to the meter 35 will always correspond to the lower of these two quantized values of the time delay. If a significant peak is not detected in any given cycle, the signal appearing on the line 21 will be continuously in the logic 0 state during the next cycle, so that no pulses will appear at the output of the gate 34.

When the apparatus illustrated in FIG. 2 is used for flow measurement it can be shown that, assuming the shape of the peak of the relevant cross-correlation function to be symmterical, the maximum fractional error of the indicated velocity due to the quantization of the time delay will not exceed 2.1% over the range of time delays from 24/F to 240/F seconds, corresponding to a 10:1 range of flow velocities; if the assumption concerning the symmetry of the peak of the cross-correlation function is not made the corresponding figure would be 4.2%. By modifying the apparatus in accordance with the present invention, however, it is possible to achieve a similar performance while requiring the generation of only half the number of delayed versions of the signal appearing at the output of the sampler 24.

Figure 3:
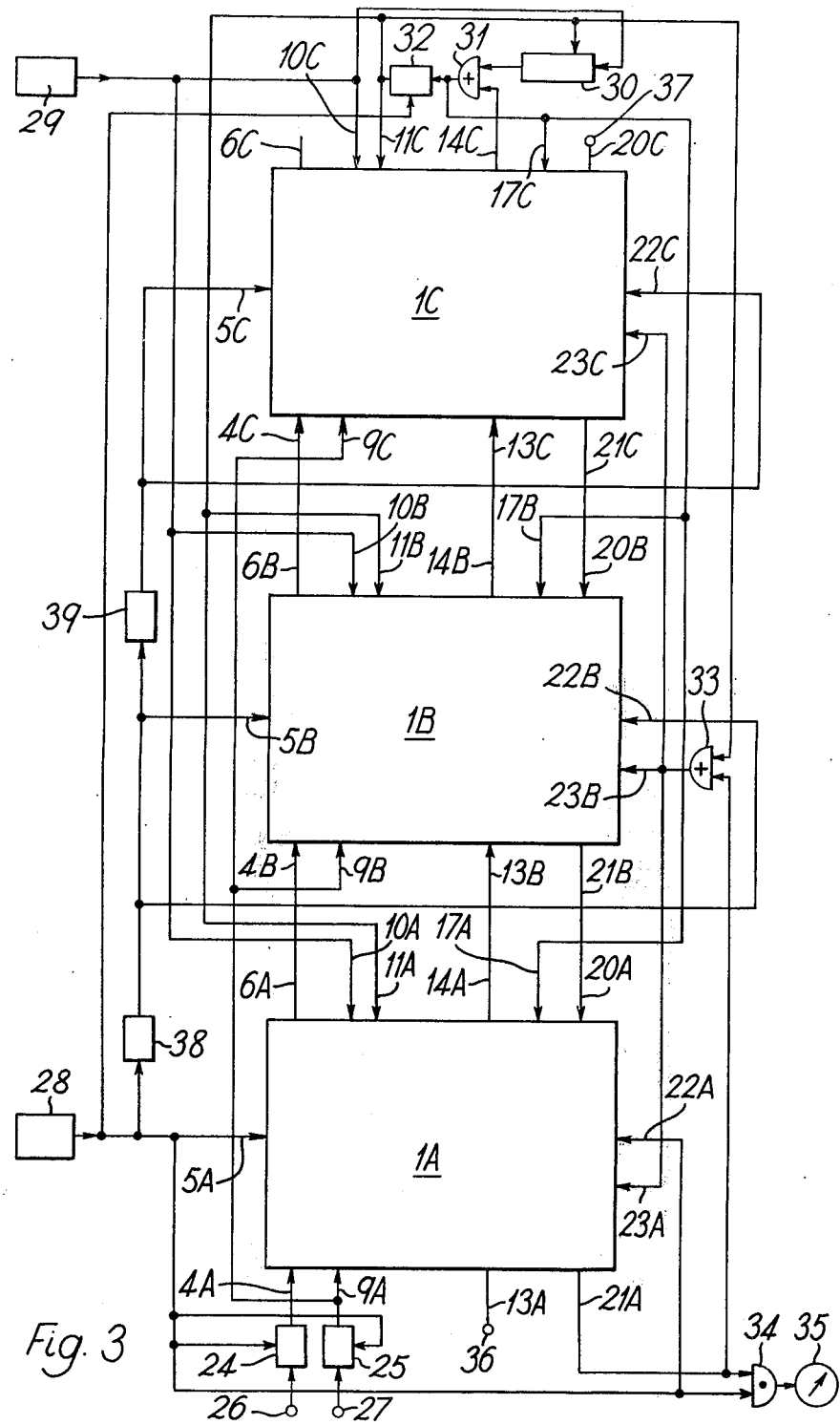
FIG. 3 is a diagram of an apparatus similar to that of FIG. 2, but modified in accordance with the present invention.

Turning now to FIG. 3, there is shown apparatus modified in accordance with this invention which is comprised of a plurality of the basic circuits shown in FIGS. 1 and 2. The apparatus of FIG. 3 utilizes three of the circuits of FIG. 1, there being identified as circuit blocks 1A, 1B and 1C. Each of the circuit blocks 1A, 1B and 1C thus contains a shift register 2A, 2B or 2C, a detector 7A, 7B or 7C, a shift register 18A, 18B or 18C and so forth, all as shown and described in connection with FIG. 1. The peripheral circuitry to the circuit blocks 1A, 1B and 1C in FIG. 3 is the same as the correspondingly numbered peripheral circuitry in FIG. 2, with the exception of the frequency dividers 38 and 39, which are provided in accordance with this invention. The number R is made 48 for the units 1A and 1B, and 24 for the unit 1C; in every other respect the units 1A, 1B and 1C are identical. The apparatus further comprises components 24 to 37 identical to the correspondingly numbered components of the apparatus shown in FIG. 2. Finally the apparatus comprises two pulse frequency dividers 38 and 39 each having a dividing factor of two, the input of the divider 38 being connected to the output of the generator 28 and the input of the divider 39 being connected to the output of the divider 38. In normal operation of the apparatus shown in FIG. 3 it is convenient to make G equal to F/4, in which case the divider 39 may be used to perform the function of the generator 29.

The lines 4A, 5A, 9A, 10A, 11A, 13A, 17A, 21A, 22A and 23A of the unit 1A, the lines 9B, 10B, 11B, 17B and 23B of the unit 1B, and the lines 9C, 10C, 11C, 14C, 17C, 20C and 23C of the unit 1C, are all connected in the same manner as for the correspondingly numbered lines of the unit 1 in the apparatus shown in FIG. 2. The lines 4B and 4C are respectively connected to the lines 6A and 6B, the lines 5B and 22B are connected to the output of the divider 38, the lines 5C and 22C are connected to the output of the divider 39, the lines 13B and 13C are respectively connected to the lines 14A and 14B, and the lines 20A and 20B are respectively connected to the lines 21B and 21C. The line 6C is left unconnected.

The apparatus shown in FIG. 3 operates in a similar manner to that shown in FIG. 2, but the function of generating delayed versions of the signal appearing at the output of the sampler 24 is now performed by the shift registers 2A, 2B and 2C connected in a serial chain (constituting a binary word register) these shift registers respectively being clocked at frequencies of F, F/2 and F/4 pulses per second. These frequencies of course have values which form a geometric progression with ratio 1/N, N in this case being two. The polarity correlation function is thus evaluated for only 120 values of y, the delay increment being 1/F seconds for the first 48 of these values, 2/F seconds for the next 48 of these values, and 4/F seconds for the last 24 of these values. The total time delay range covered is thus effectively the same as for the apparatus shown in FIG. 2.

The delay indicator of the apparatus shown in FIG. 3 comprises the shift registers 18C, 18B and 18A connected in a serial chain, these shift registers respectively being clocked at frequencies of F/4, F/2 and F pulses per second. A logic 1 state will therefore be shifted through the shift register 18C at half the rate for the shift register 18B, which is in turn half the rate for the shift register 18A. As a result when a significant peak in the correlation function has been detected in any given cycle the frequency of the train of pulses fed to the meter 35 during the next cycle will again be approximately inversely proportional to the time delay between the noise signals, and hence in the case of flow measurement directly proportional to the flow velocity.

The apparatus described above is an example of an apparatus of the kind specified in which for each comparison operation the individual comparisons between the state of the second of the two binary signals and the digits of the binary word are all effected simultaneously. In other apparatuses of the kind specified these individual comparisons may be arranged to effected sequentially for each comparison operation, the contents of the register being updated at each of the series of regularly recurrent instants and being recirculated during each interval between these instants; in such a case the counting means may conveniently be constituted by a set of recirculating stores associated with appropriate arithmetic units. The present invention may equally well be utilised in this form of apparatus of the kind specified.

We claim:

1. An apparatus for comparing two binary signals, comprising:
    a binary word register comprising a plurality of binary shift registers each having a serial input and each comprising a set of serially connected stages, said shift registers being connected in a serial chain so that the stages of all said shift registers form a sequence defining the sequence of digit positions of a binary word stored in said binary word register;
    means for operating said binary word register so that it stores temporarily, in respect of each of a series of regularly recurrent instants, a binary word the digits of which correspond in sequence to the states of a first one of said two binary signals at times earlier by successively greater amounts than the relevant one of said series of instants, said means comprising means for operating said shift registers individually so that those digits of the binary word temporarily stored in the first of said shift registers in said chain can change state for each of the instants of said series while those digits of the binary word temporarily stored in any other of said shift registers can change state only for each Nth one of the instants for which those digits of the binary word temporarily stored in the preceding one of said shift registers in said chain can change state, N being a small integer;

means for effecting a sequence of comparison operations in each of which the state of the second of said two binary signals is compared with each of the digits of the binary word temporarily stored in said binary word register;

means for counting the results of the comparisons separately for each of said digit positions; and signalling means for generating a signal in response to the reaching of a given value by the count for any one of said digit positions, said signalling means comprising means causing the signal to have a form indicating for which of said digit positions the count first reached said given value.

2. An apparatus according to claim 1, in which said means for operating said shift registers is operative so that N is 2.

3. An apparatus according to claim 1, in which said signalling means comprises means causing the signal to have a form indicating the value of the delay for that delayed version of said first one of said two binary signals corresponding to that one of said digit positions for which the count first reached said given value.

4. An apparatus according to claim 1, in which said means for operating said binary word register comprises:

means for applying said first one of said two binary signals continuously to said serial input of the first of said shift registers in said chain;

means for generating a plurality of trains of regularly recurrent clock pulses, the number of said trains being equal to the number of said shift registers and the respective frequencies of said trains having values which form a geometric progression with ratio 1/N; and means for applying said trains of clock pulses respectively to said shift registers so as to determine the instants at which the states of the stages of said shift registers can change, with the frequencies of said trains arranged in descending order along said chain.

5. An apparatus according to claim 1, further comprising control means for repeatedly restoring said counting means to a condition of zero count for all said digit positions and thereby causing the apparatus to operate in repeated cycles.

6. An apparatus according to claim 1, in which said control means comprises means operative to restore said counting means to a condition of zero count in response to the reaching of said given value by the count for any one of said digit positions and also in response to the occurrence of a given number of said comparison operations without the count having reached said given value for any of said digit positions, said given number being between once and twice said given value.

7. An apparatus according to claim 1, in which said signalling means comprises;

a pattern register capable of storing a number of binary digits equal to the number of said digit positions;

means for causing said pattern register to store during each cycle a pattern of binary digits indicating for which of said digit positions the count first reached said given value during the preceding cycle; and means for generating during each cycle a signal in the form of a train of pulses having a repetition frequency dependent on the pattern stored in said pattern register during that cycle.

8. An apparatus according to claim 1, in which said signal generating means is operative so that said repetition frequency is substantially inversely proportional to the value of the delay for that delayed version of said first one of said two binary signals corresponding to that one of said digit positions for which the count first reached said given value.

* * * * *

UNITED STATES PATENT OFFICE
CERTIFICATE OF CORRECTION

PATENT NO. : 3,947,673
DATED : March 30, 1976
INVENTOR(S) : James R. JORDAN, et al It is certified that error appears in the above-identified patent and that said Letters Patent are hereby corrected as shown below:

Column 2, line 40, delete the minus (-) sign appearing between A(t) and B(t-y).

Column 2, lines 50-55, the equation should read $$\frac{1}{T} \int_0^T \frac{A(t)}{|A(t)|} \frac{B(t-y)}{|B(t-y)|} dt$$

Column 4, line 43, the letter "f" should read "F".

Column 4, line 55, "it" should read "It".

Column 6, line 13, after "function" insert "is".

Claim 6 should be dependent on Claim 5.

Claim 7 should be dependent on Claim 5.

Claim 8 should be dependent on Claim 7.

Signed and Sealed this fifteenth Day of June 1976

[SEAL]

Attest:

RUTH C. MASON
Attesting Officer

C. MARSHALL DANN
Commissioner of Patents and Trademarks